(12) United States Patent
Chiang et al.

(10) Patent No.: US 10,664,071 B2
(45) Date of Patent: May 26, 2020

(54) ELECTRONIC APPARATUS AND CONTROL METHOD

(71) Applicant: PEGATRON CORPORATION, Taipei (TW)

(72) Inventors: Chia-Liang Chiang, Taipei (TW); Chang-Hsien Wu, Taipei (TW); Chien-Sheng Lo, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/247,649

(22) Filed: Jan. 15, 2019

(65) Prior Publication Data

US 2019/0278390 A1 Sep. 12, 2019

(30) Foreign Application Priority Data

Mar. 9, 2018 (TW) .............................. 107108149 A

(51) Int. Cl.
*G06F 1/26* (2006.01)
*G06F 3/0354* (2013.01)
*G06F 1/16* (2006.01)

(52) U.S. Cl.
CPC ........ *G06F 3/03545* (2013.01); *G06F 1/1607* (2013.01); *G06F 1/1626* (2013.01); *G06F 2200/1632* (2013.01)

(58) Field of Classification Search
None
See application file for complete search history.

(56) References Cited

U.S. PATENT DOCUMENTS

| 2006/0174139 A1* | 8/2006 | Keely ................... G06F 1/3203 713/300 |
| 2015/0091817 A1* | 4/2015 | Chien ................ G06F 3/03545 345/173 |
| 2016/0207348 A1* | 7/2016 | Valencia ............... A47F 7/0021 |

FOREIGN PATENT DOCUMENTS

| CN | 103870142 A | 6/2014 |
| CN | 104516564 A | 4/2015 |
| CN | 204667344 U | 9/2015 |

* cited by examiner

*Primary Examiner* — Carl Adams
(74) *Attorney, Agent, or Firm* — McClure, Qualey & Rodack, LLP

(57) ABSTRACT

An electronic apparatus has a slot for accommodating a stylus. The electronic apparatus includes a locking module, an input interface and a control circuit. The locking module is disposed adjacent to the slot. The locking module is configured to have a locked mode and an unlocked mode. Under the locked mode, the locking module is configured to lock the stylus in the slot. The input interface is configured to obtain authentication information. The control circuit is configured to verify the authentication information obtained by the input interface. When the authentication information is verified, the control circuit switches the locking module from the locked mode into the unlocked mode.

12 Claims, 6 Drawing Sheets

ELECTRONIC APPARATUS AND CONTROL METHOD

CROSS-REFERENCE TO RELATED APPLICATION

This application claims priority to Taiwan Application Serial Number 107108149, filed Mar. 9, 2018, which is herein incorporated by reference in its entirety.

BACKGROUND

Technical Field

The present disclosure relates to an electronic apparatus and a control method. More particularly, the present disclosure relates to an electronic apparatus having a slot for accommodating a stylus and a method of controlling the electronic apparatus.

Description of Related Art

In order to provide high accurate and convenient input interfaces, electronic products (e.g., tablet computer, flip notebook, pluggable notebook, etc.) on the market are designed with a corresponding stylus. In addition, in order to provide more diverse functions on the stylus, electronic products with built-in active stylus are becoming increasingly popular.

The stylus, to which the electronic apparatus corresponds, is not cheap and may have many models. If the stylus is lost, it is very troublesome to buy the same or compatible stylus again. In addition, the active stylus is arranged with circuit components having special functions, and the price of the stylus is thus increased. If it is lost or stolen, more loss and trouble will be caused to a user.

SUMMARY

An embodiment of the present disclosure is to provide an electronic apparatus. The electronic apparatus has a slot for accommodating a stylus. The electronic apparatus includes a locking module, an input interface, and a control circuit. The locking module is disposed adjacent to the slot, and the locking module has a locked mode and an unlocked mode. The locking module is used to lock the stylus in the slot when under the locked mode. The input interface is used to obtain authentication information. The control circuit is coupled to the locking module and the input interface. The control circuit is used to verify the authentication information obtained by the input interface. When the authentication information is verified, the control circuit switches the locking module from the locked mode to the unlocked mode.

Another one embodiment of the present disclosure is to provide a control method which is applied to an electronic apparatus having a slot for accommodating a stylus, and the control method includes following steps: locking the stylus in the slot under a locked mode; obtaining authentication information; and checking the authentication information, and switching from the locked mode to an unlocked mode if the authentication information is verified.

Through the electronic apparatus and the control method in the above embodiments, the identity authentication can be performed before the stylus is unlocked, and the security of the stylus is also improved.

DETAILED DESCRIPTION

Embodiments of the present disclosure are described below with reference to the accompanying drawings. In each figure, the same reference numbers are for indicating the same or similar components or steps.

Figure 1:
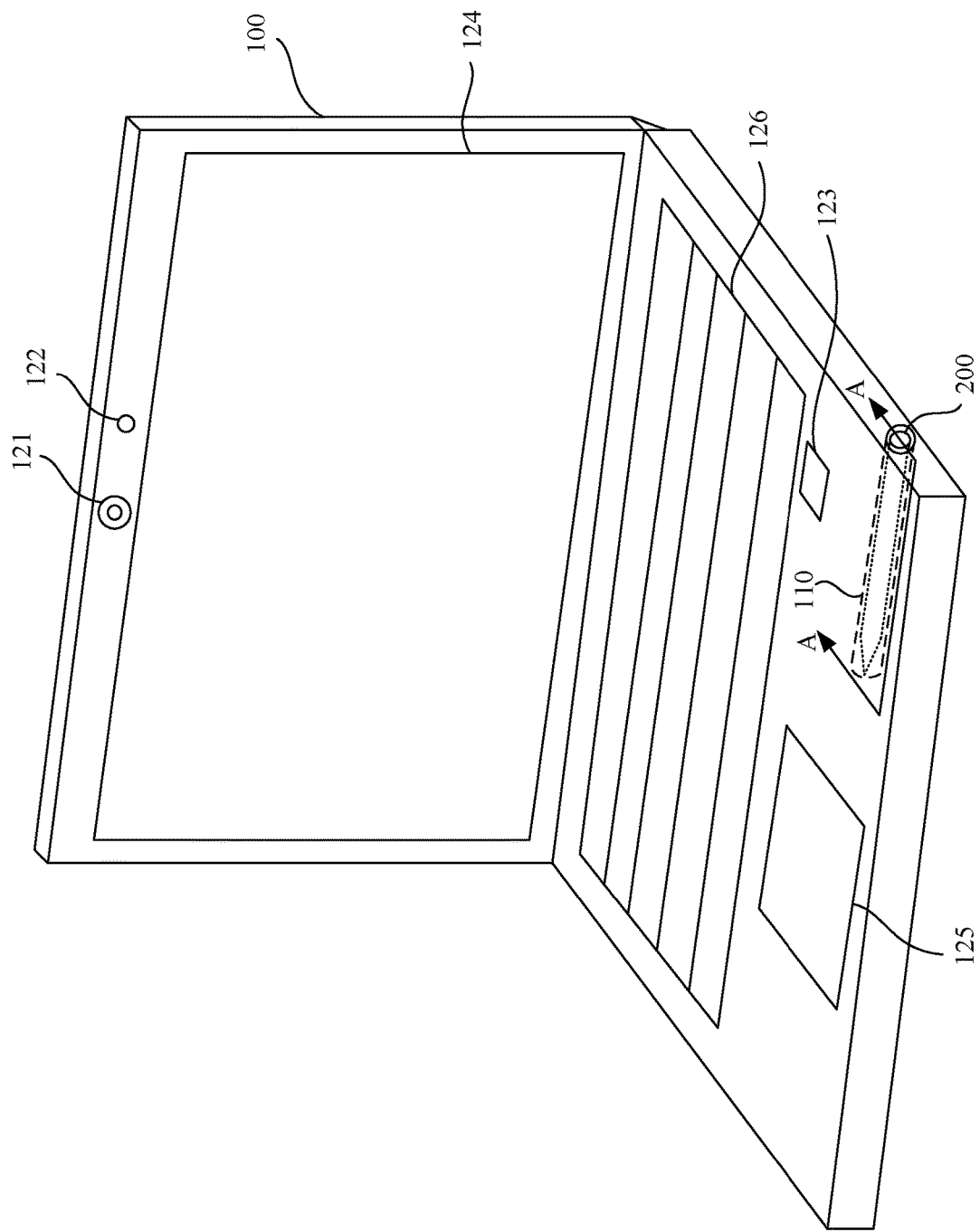
FIG. 1 shows a schematic diagram of an appearance of an electronic apparatus according to an embodiment of the present disclosure.

FIG. 1 is a schematic diagram of an appearance of an electronic apparatus 100 according to an embodiment of the present disclosure. As shown in FIG. 1, the electronic apparatus 100 has a slot 110 that can be used to accommodate the stylus 200. In this embodiment, the stylus 200 is used with the electronic apparatus 100, and is used as an input device of the electronic apparatus 100. When the stylus 200 is to be used by a user, the stylus 200 can be extracted from the slot 110, and the stylus 200 can be used to perform different functions (e.g., drawing, text input, circled objects, and waking-up the electronic apparatus 100). When the stylus 200 is not needed, the stylus 200 can be inserted and stored in the slot 110 in order to move the stylus 200 together with the electronic apparatus 100 for easy carrying.

In an embodiment, in order to prevent the stylus 200 from being lost or being stolen, the electronic apparatus 100 locks the stylus 200 in the slot 110 when accommodating the stylus 200. Before the stylus 200 is extracted to be used, the electronic apparatus 100 collects authentication information to check an identity of a user. If the identity of the user is verified, the stylus 200 is unlocked for use. If the identity of the user is not verified, the stylus 200 is kept being locked in the slot 110. As a result, the stylus 200 can be prevented from being easily taken out by an unspecified person, and the risk of being lost or being stolen can be reduced. The detailed operations regarding herein are further given in the following paragraphs.

In the embodiment shown in FIG. 1, the electronic apparatus 100 is a notebook computer for illustrative purposes. In a practical application, the electronic apparatus 100 may be a tablet computer, a flip notebook a pluggable notebook, a personal digital assistant (PDA), a smart phone, or other electronic apparatus with a stylus slot, and the present disclosure is not limited by FIG. 1.

Figure 2:
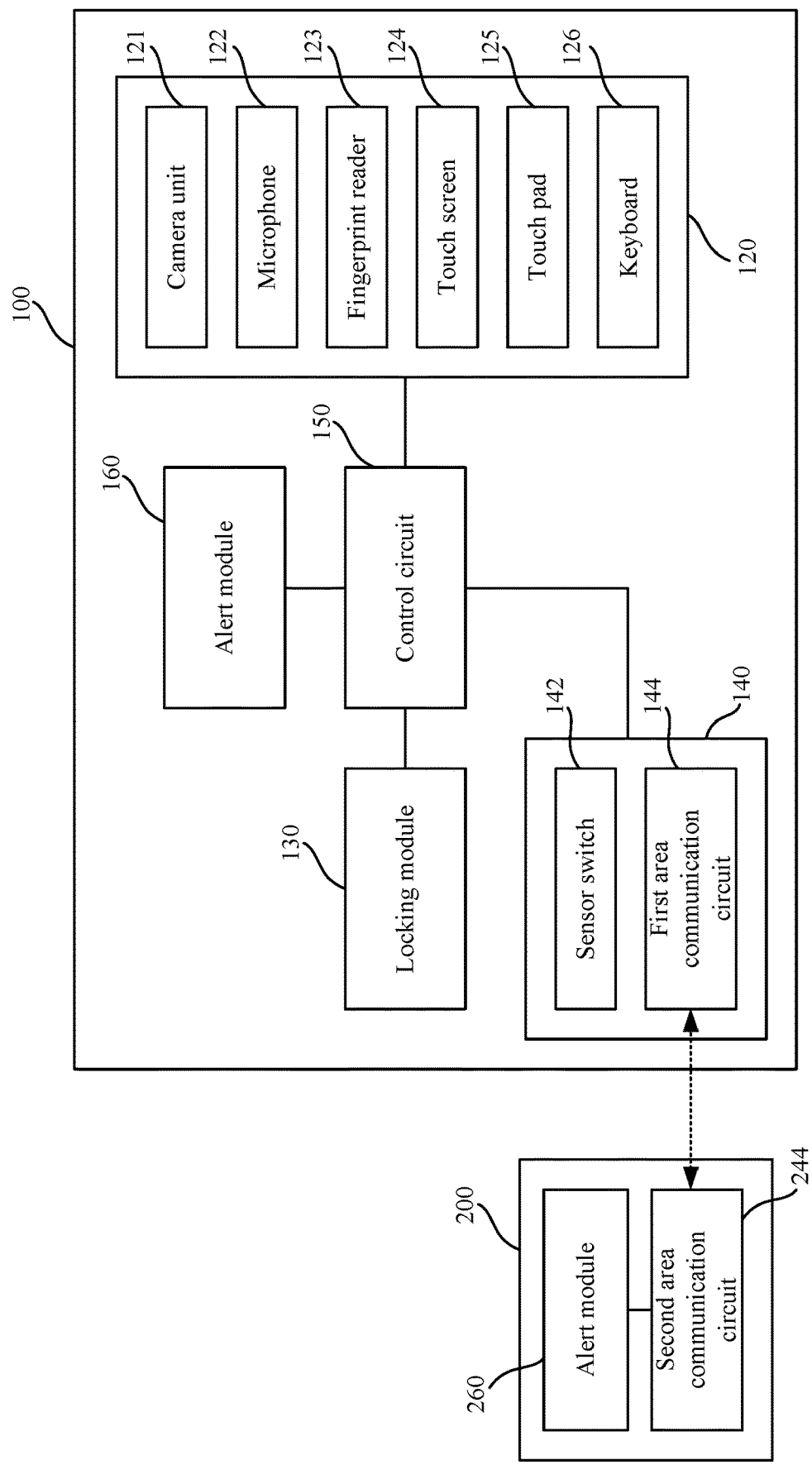
FIG. 2 shows a functional block diagram of the electronic apparatus of FIG. 1.

Reference is also made to FIG. 2. FIG. 2 is a functional block diagram of the electronic apparatus 100 of FIG. 1. As shown in FIG. 2, the electronic apparatus 100 includes an input interface 120, a locking module 130, a sensor module 140, a control circuit 150, and an alert module 160. The control circuit 150 is electrically coupled to the input interface 120, the locking module 130, the sensor module 140, and the alert module 160. The control circuit 150 may be a central processing unit (CPU), a processor, or a system-on-chip (SoC) circuit of the electronic apparatus 100.

The input interface 120 is configured to obtain the authentication information, in order to check the identity authentication of the user. In the embodiment shown in FIG. 1 and FIG. 2, the input interface 120 includes a camera unit 121, a microphone 122, a fingerprint reader 123, a touch screen 124, a touch pad 125, and a keyboard 126. The input interface 120 is configured to obtain a biometric feature of a user as the authentication information from the above elements, or to allow the user to input an unlock command as the authentication information. For example, the camera unit 121 can capture an image of the user, in order to identify the facial feature or a pupil feature of the user. The microphone 122 can collect a voice input of the user to obtain a voiceprint feature of the user. The fingerprint reader 123 can collect a fingerprint feature of the user. The user can input various unlock command, such as a specific unlock pattern, an unlock gesture, or an unlock password via the touch screen 124 or the touch pad 125. The user can also input the unlock password via the keyboard 126.

The input interface 120 of the electronic apparatus 100 in the embodiments shown in FIG. 1 and FIG. 2 is arranged with a plurality of input elements, such as the camera unit 121, the microphone 122, the fingerprint reader 123, the touch screen 124, the touch pad 125, and the keyboard 126 mentioned above. However, the present disclosure is not limited thereto. In an embodiment, the input interface 120 includes at least one of the camera unit 121, the microphone 122, the fingerprint reader 123, the touch screen 124, the touch pad 125, or the keyboard 126. For example, in one embodiment, the input interface 120 includes the camera unit 121, and the camera unit 121 generates biometric features, such as the facial feature or the pupil feature, as the authentication information. For example, in another embodiment, the input interface 120 includes the touch screen 124, and the touch screen 124 receives an unlock command such as the unlock pattern, the unlock gesture or the unlock password, as the authentication information.

Referring to both of FIG. 1 and FIG. 2, the locking module 130 is disposed adjacent to the slot 110. For example, the locking module 130 is disposed near an opening of the slot 110, or is disposed within the electronic apparatus 100 and abutted against a sidewall of the slot 110. In this embodiment, the locking module 130 can be switched between a locked mode and an unlocked mode. Under the locked mode, the locking module 130 is configured to lock the stylus 200 in the slot 110.

Figure 3:
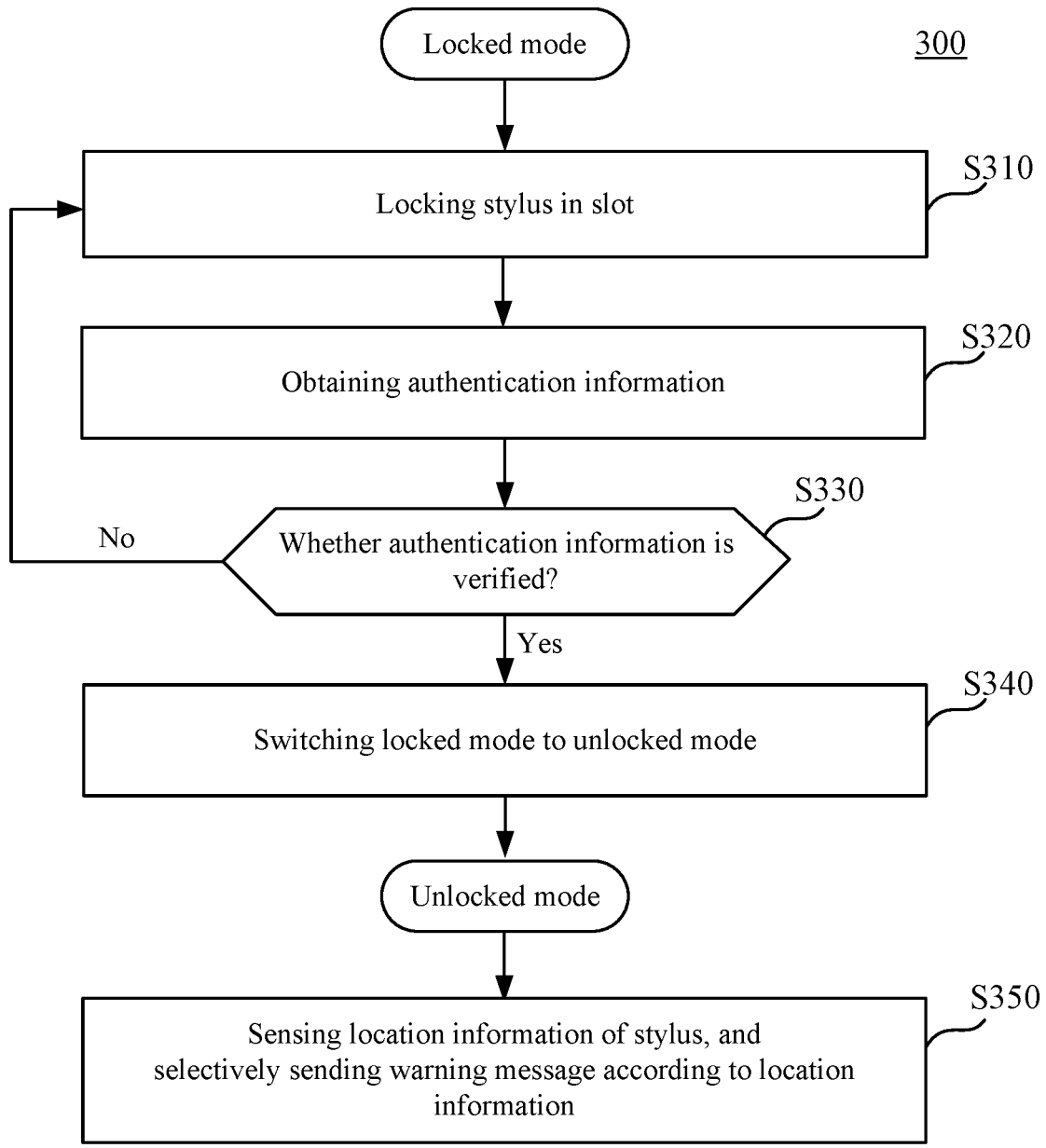
FIG. 3 shows a flow chart of a method in accordance with an embodiment of the present disclosure.
Figure 4A:
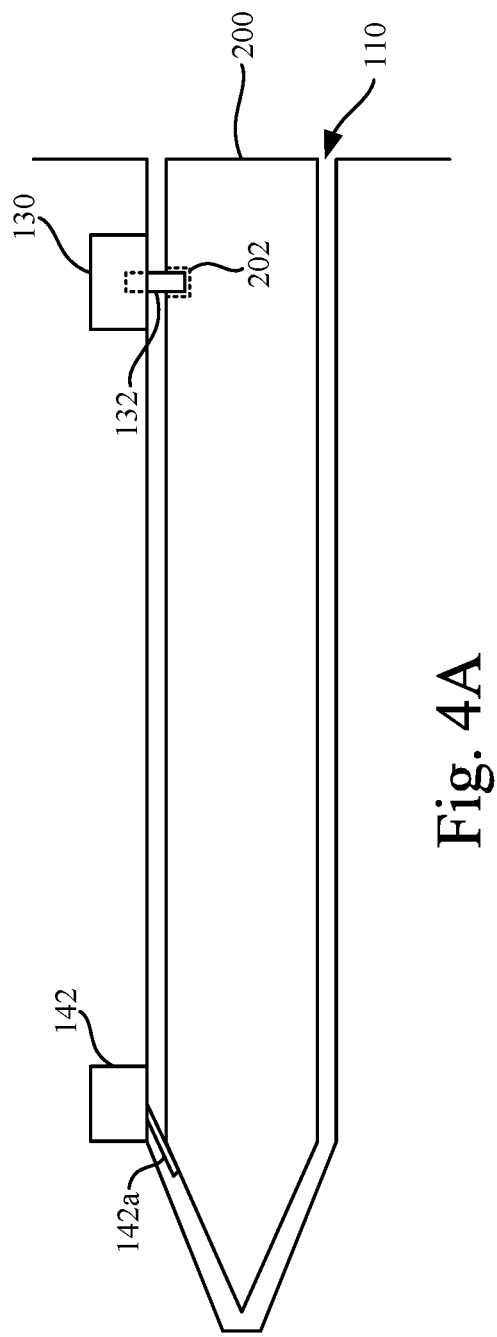
FIG. 4A shows a partial cross-sectional view, along the section line A-A, of the electronic apparatus slot and the stylus of FIG. 1 under a locked mode.

Referring to FIG. 3, which is a flow chart of a control method 300 according to one embodiment of the present disclosure. The control method 300 can be applied to the electronic apparatus 100 and the stylus 200 shown in FIGS. 1 and 2. As shown in FIG. 3, under the locked mode, step S310 of the control method 300 is performed. In step 310, the stylus 200 is locked in the slot 110 by the locking module 130. Referring to FIG. 4A, which is a partial cross-sectional view, along a section line A-A, of the slot 110 and the stylus 200 of the electronic apparatus 100 of FIG. 1 under the locked mode.

In the embodiment shown in FIG. 4A, the locking module 130 has a bump structure 132, and the locking module 130 can include an actuator switch (not shown) or a microelectromechanical switch (not shown) for adjusting the location of the bump structure 132 according to the control of the control circuit 150. Under the locked mode, the control circuit 150 controls the locking module 130, in order to make the bump structure 132 be pushed down into a groove 202 of a side of the stylus 200. In this way, the stylus 200 can be locked in the slot 110, and is thus not able to be easily pulled out by an unspecified person. In practical applications, the locking module 130 is not limited to have the bump structure 132. The locking module 130 may also include a latch structure, a clip structure, a baffle structure, or other fixed structures for locking the stylus 200. The replacements of the fixed structures are understood by a person skilled in the art, and thus the detailed descriptions are not further given herein.

In an embodiment, the sensor module 140 includes a sensor switch 142. The sensor switch 142 is disposed adjacent to the slot 110, and the sensor switch 142 is configured to detect whether the stylus 200 is located in the slot 110, thereby generating location information of the stylus 200. In the embodiment shown in FIG. 4A, the sensor switch 142 includes a movable mechanical structure 142*a*. In this embodiment, the movable mechanical structure 142*a* may be a shrapnel structure. The movable mechanical structure 142*a* is disposed at one end of the slot 110. When the stylus 200 is located in the slot 110, the movable mechanical structure 142*a* is pushed to the left side. The sensor switch 142 can determine whether the stylus 200 is located in the slot 110 according to the location or a movement of the movable mechanical structure 142*a*. In practical applications, the sensor switch 142 is not limited to have the shrapnel structure as shown in FIG. 4A, and may be implemented by other movable mechanical structures such as a spring, a slider, a toggle switch, and the like. The present disclosure is not limited to the sensor switches 142 having movable mechanical structures 142*a* (e.g., shrapnel structure, spring, slider, toggle switch, etc.).

In another embodiment, the sensor switch 142 can be implemented with an optical sensor. For example, a light-emitting unit and a corresponding optical sensor are disposed in the slot, and the location information of the stylus 200 is determined according to an intensity of the optical signal received by the optical sensor.

In a further embodiment, the sensor switch 142 can be implemented with an electrical contact sensor. For example, a conductive path is set at a corresponding location of the stylus 200, and two protruding electrical contacts are disposed on the inner side of the slot for sensing whether an electrical connection between the two electrical contacts is conducted or cut-off in order to determine the location information of the stylus 200.

Step S320 of the control method 300 is performed. In step S320, the authentication information, such as the biometric feature or the unlock command, is obtained by the input interface 120 (e.g., at least one of the camera unit 121, the microphone 122, the fingerprint reader 123, the touch screen 124, the touch pad 125, or the keyboard 126, shown in FIGS. 1 and 2).

In an embodiment, a user must preset or establish user identity information to be used on the electronic apparatus 100. For example, facial features or fingerprint features of the user or unlock password are preset in the electronic apparatus 100. Step S330 of the control method 300 is performed. In step 330, the control circuit 150 compares the authentication information obtained by the input interface 120 with the stored user identity information. If the comparison is not matched, the authentication information is determined to be not verified, and step S310 is performed to lock the stylus 200 in the slot 110 by the locking module 130 continuously.

Figure 4B:
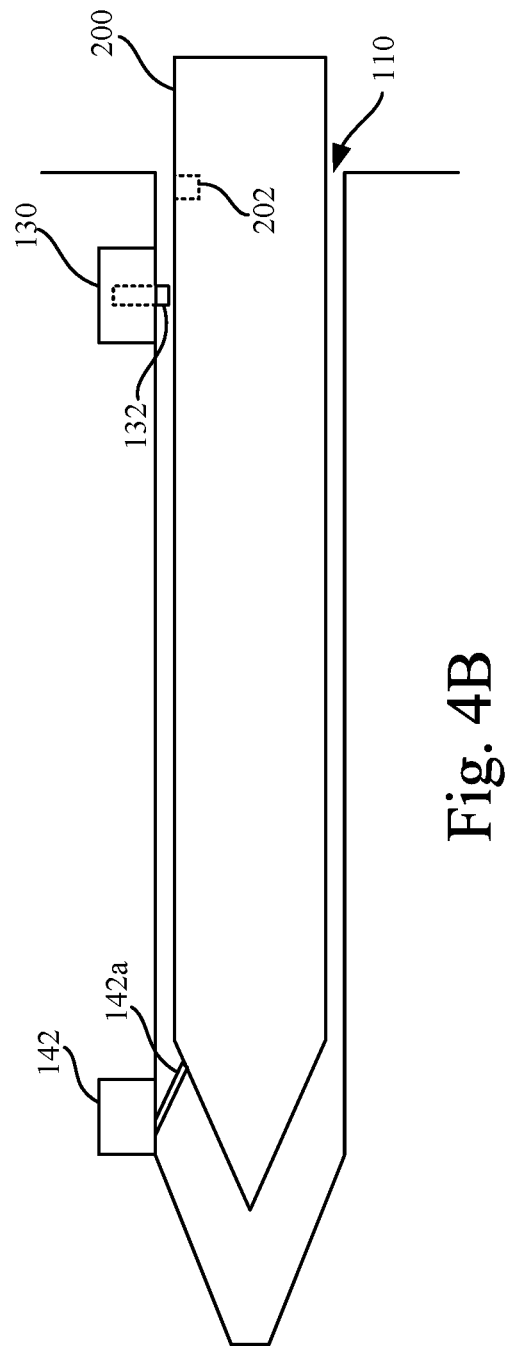
FIG. 4B shows a partial cross-sectional view, along the section line A-A, of the electronic apparatus slot and the stylus of FIG. 1 under an unlocked mode.

On the other hand, if the comparison is matched, the authentication information is determined to be verified, and step S340 is performed. In step S340, the control circuit 150 switches the locking module 130 from the locked mode to the unlocked mode. Reference is also made to FIG. 4B, which is a partial cross-sectional view, along a section line A-A, of the slot 110 and the stylus 200 of the electronic apparatus 100 of FIG. 1 under the unlocked mode. As shown in FIG. 4B, under the unlocked mode, the control circuit 150 controls the locking module 130 to slide the bump structure 132 upwardly away from the groove 202 on the side of the stylus 200, and thus the stylus 200 is not locked. Accordingly, the stylus 200 can be freely removed from the slot 110.

Moreover, as shown in FIG. 4B, when the authentication information is verified, the control circuit 150 controls the sensor switch 142 to drive the movable mechanical structure 142a to rotate to the right. The movable mechanical structure 142a pushes one end of the stylus 200, in order to eject at least a portion of the stylus 200, such as an end of the stylus 20, from the slot 110. As a result, the user can be informed that the authentication information is verified, and that the stylus 200 can be conveniently taken out by the user. In this embodiment, the sensor switch 142 can include an actuation switch (not shown) or a microelectromechanical switch (not shown), in order to change the position or force direction of the movable mechanical structure 142a in accordance with control of the control circuit 150.

Through the above steps S310 to S340, the electronic apparatus 100 can complete the identity authentication of the user, in order to provide the stylus 200 to a qualified (i.e., the authentication information is verified) user. Accordingly, the stylus 200 is prevented from being stolen. After the stylus 200 is used for a while, the stylus 200 may still be forgotten to be stored back to the slot 110 by the user, resulting in a loss of the stylus 200. Therefore, under the unlocked mode, step S350 may be further performed. In step S350, the location information of the stylus 200 is sensed, and a warning message is selectively sent according to the location information. The detailed operation of step S350 is further explained in the following paragraphs.

Figure 5A:
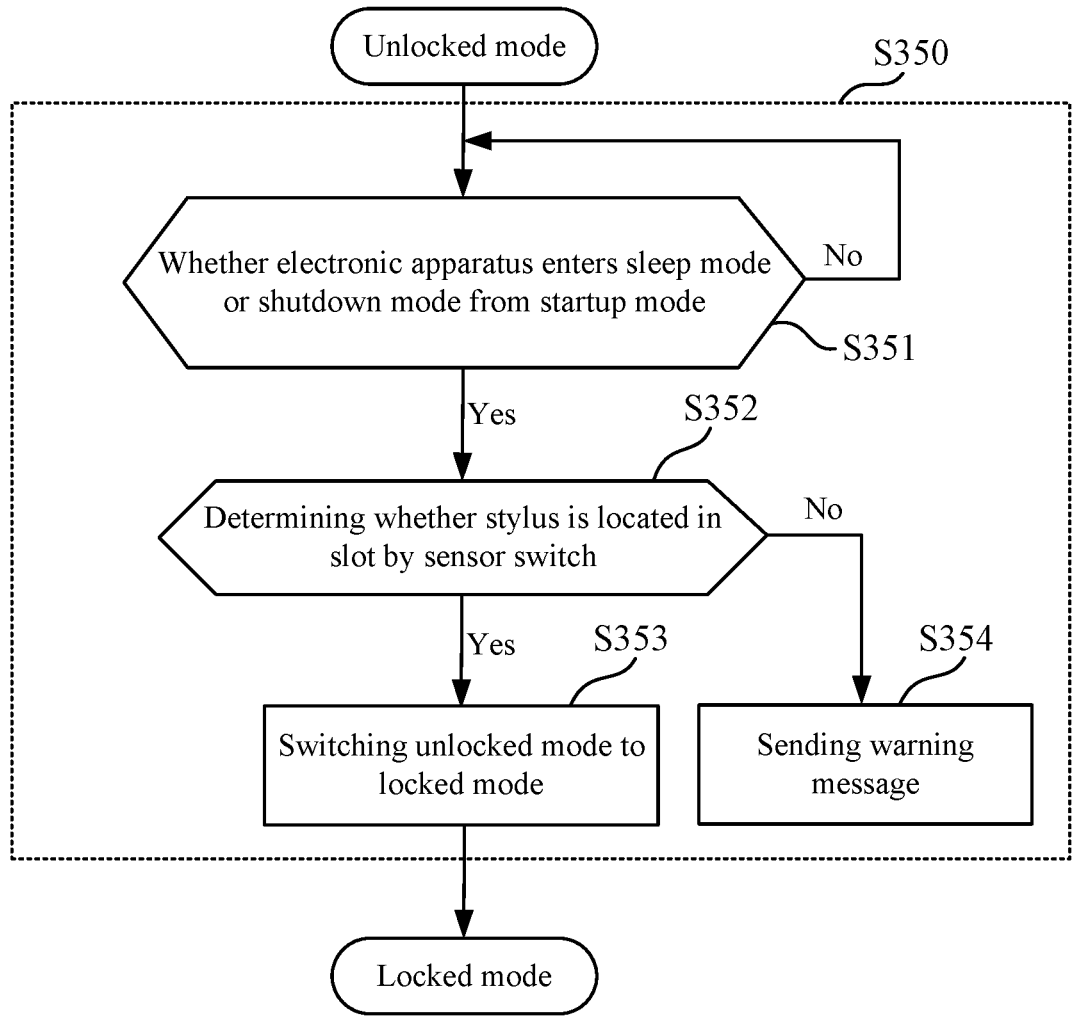
FIG. 5A shows a flow chart of a method in further detailed steps of one of the steps in accordance with an embodiment of the present disclosure.

As shown in FIG. 2, the sensor module 140 can include a sensor switch 142. Referring to FIG. 5A, a flow chart of a method for further detailed steps S351-S354 of step S350 in accordance with an embodiment of the present disclosure is shown. As shown in FIG. 5A, step S351 is first performed. In step S351, the control circuit 150 is employed to determine whether the electronic apparatus 100 is to enter a sleep mode or a shutdown mode from a startup mode. For example, the control circuit 150 can read a current operating mode of the electronic apparatus 100 via an operating system executed in the electronic apparatus 100, in order to determine whether the electronic apparatus 100 is to enter the sleep mode or the shutdown mode.

In another embodiment, the control circuit 150 can determine the current operating mode of the electronic apparatus 100 based on a power signal provided by of a power module (not shown) of the electronic apparatus 100. In a further embodiment, the control circuit 150 can determine the current operating mode of the electronic apparatus 100 based on a current physical operating status, which may be, for example, an activation or a deactivation of a screen of the electronic apparatus 100, a closed status of upper and lower covers of the electronic apparatus 100, etc., of the electronic apparatus 100. The control circuit 150 can detect the current operating mode of the electronic apparatus 100 by different sensors of the electronic apparatus 100. The above detection method is understood by a person skilled in the art, and other detections are not further given herein.

When the control circuit 150 determines that the electronic apparatus 100 is to enter the sleep mode or the shutdown mode from the startup mode, step S352 is performed. In step S352, the sensor switch 142 determines whether the stylus 200 is located in the slot 110. Referring to FIGS. 4A and 4B, the location information of the stylus 200 is determined by the movable mechanical structure 142a of the sensor switch 142.

If the stylus 200 is determined to be located in the slot 110, step S353 is performed. In step S353, the control circuit 150 switches the locking module 130 from the unlocked mode to the locked mode. If the stylus 200 is determined to be not located in the slot 110, step S354 is performed. In step S354, the control circuit 150 controls the alert module 160 of the electronic apparatus 100 to send a warning message. In an embodiment, the alert module 160 of the electronic apparatus 100 can include an indicator light, a speaker, a vibrator, or a display screen. When the control circuit 150 controls the alert module 160 to send the warning message, the indicator light can flash or emit a specific color light, the speaker can generate a specific warning sound, the vibrator can drive the electronic apparatus 100 to vibrate, and the display screen can display related text prompts, in order to inform the user that the stylus 200 is not returned to the slot 110 yet.

Generally, when the electronic apparatus 100 is in an activated state, the stylus 200 may have higher possibilities to be operated by a user. If the electronic apparatus 100 is to be switched to the sleep mode or the shutdown mode, it indicates that the user has completed the current work, and the electronic apparatus 100 may be moved to next destination by the user. Under this condition, if the stylus 200 has not returned to the slot 110, the stylus 200 may be lost. With step S350 of FIG. 5A, the user can be reminded to retract the stylus 200 into the slot 110 when the electronic apparatus 100 enters the sleep mode or the shutdown mode.

Figure 5B:
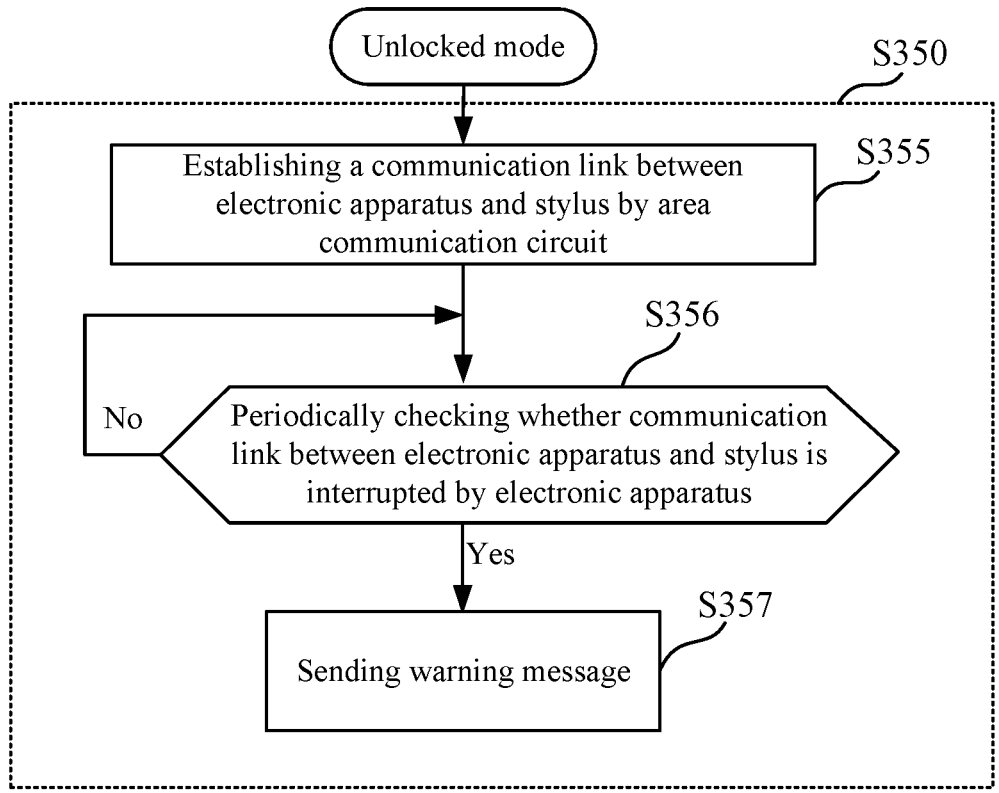
FIG. 5B shows a flow chart of a method in further detailed steps of one of the steps in accordance with an embodiment of the present disclosure.

Referring to FIG. 5B, which is a flow chart of further detailed steps S355-S357 of step S350 according another embodiment of the present disclosure. In this embodiment, as shown in FIG. 2, the sensor module 140 further includes a first area communication circuit 144. In this embodiment, the stylus 200 is an active stylus, and as shown in FIG. 2, the stylus 200 further includes a second area communication circuit 244 and an alert module 260.

In practical applications, each of the first area communication circuit 144 and the second area communication circuit 244 may be a Bluetooth communication transceiver, a WiFi-direct communication transceiver, a Zigbee communication transceiver, an infrared communication transceiver, a Radio Frequency Identification (RFID) communication transceiver, or other equal area communication transceivers.

As shown in FIG. 5B, under the unlocked mode, step S350 includes step S355. The first area communication circuit 144 of the sensor module 140 and the second area communication circuit 244 of the stylus 200 are employed to establish a communication link between the electronic apparatus 100 and the stylus 200. Generally, the first area communication circuit 144 and the second area communication circuit 244 have a communication range (e.g., 3 meters, 5 meters, 10 meters, or 50 meters). When the first area communication circuit 144 and the second area communication circuit 244 are too far apart from each other and beyond the communicable range, the communication link is interrupted. In step S356, the electronic apparatus 100 periodically checks whether the communication link between the electronic apparatus 100 and the stylus 200 is interrupted (or checks whether signal strength of the communication link is lower than a threshold value) by using the first area communication circuit 144.

When the communication link is interrupted (or when the signal strength of the communication link is lower than the threshold value), it indicates that the electronic apparatus 100 and the stylus 200 have been separated too far. This situation may be happened when the electronic apparatus 100 is carried by a user but the stylus 200 is stayed behind, or when the stylus 200 is carried by a user but the electronic apparatus 100 is stayed behind, or when the stylus 200 is carried away from the surroundings of the electronic apparatus 100 by others. Under this condition, the communication link has been interrupted (or the signal strength of the communication link has reduced below the threshold value), step S357 is performed. In step S357, the warning message is sent. The warning message can be expressed by light, sound, vibration or text message by the alert module 160 (e.g., the indicator light, the speaker, the vibrator or the display screen) of the electronic apparatus 100. In this embodiment, the stylus 200 also has an alert module 260 (e.g., the indicator light, the speaker, or the vibrator), which can also emit light, sound or vibration.

As a result, if the active stylus 200 is stolen, and the stylus 200 is taken away the electronic apparatus 100 by a certain distance, the warning message is sent by the electronic apparatus 100 and/or the stylus 200, in order to alert the user and deter others.

In one embodiment, step S350 of FIG. 3 includes steps S351-S354 of FIG. 5A. In another one embodiment, step S350 of FIG. 3 includes steps S355-S357 of FIG. 5B. In yet another embodiment, step S350 of FIG. 3 includes both steps S351-S354 of FIG. 5A and steps S355-S357 of FIG. 5B. The steps in the two figures may be performed simultaneously or sequentially by the control circuit 150 of the electronic apparatus 100.

In one embodiment, the first area communication circuit 144 of the electronic apparatus 100 and the second area communication circuit 244 of the stylus 200 are paired with each other. For example, based on the pairing configuration of the Bluetooth communication, the first area communication circuit 144 and the second area communication circuit 244 mutually record respective media access control addresses (MAC addresses). In other words, the identification information of the second area communication circuit 244 of the stylus 200 (e.g., MAC address thereof) can be stored in the electronic apparatus 100. Under the locked mode, the control circuit 150 determines whether the stylus 200 located in the slot 110 is a paired stylus based on the identification information. If the control circuit 150 detects that the stylus 200 in the slot 110 is not a paired stylus, a corresponding warning message may be send to inform a user. In this way, the user can be prevented from taking a stylus having a similar shape of others by mistake.

The electronic apparatus 100 and the control method 300 in the above embodiments can prevent a user from forgetting the stylus 200 that the electronic apparatus 100 is equipped with. The user can be reminded to collect the stylus 200 when the electronic apparatus 100 is switched to the sleep mode or the shutdown mode by the user, so that the stylus 200 can be prevented from being lost or stolen by others. By performing identity authentication before the stylus 200 is unlocked, the security of the stylus 200 is also improved.

In the document, certain terms are used to describe specific elements in the embodiments. It should be appreciated, by person skilled in the art, that that same element can be described in more than one way. The elements in the document are not only differed from each other by the given terms, but also by the differences on functions thereof. The term "comprise" or "include" in the document is interpreted as "including but not limited to." Moreover, the term "coupled" may mean "directly coupled" or "indirectly coupled." Accordingly, if a first element is coupled to a second element, it indicates that the first element may be connected to the second element directly or indirectly via various connections (which may include, electrically connecting, wirelessly connecting, or optically coupling, or other connections).

As used herein, the term "and/or" includes any and all combinations of one or more of the associated listed items. Moreover, as used herein, terms written in singular forms are intended to include the plural forms as well, unless the context clearly indicates otherwise.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic apparatus having a slot for accommodating a stylus, the electronic apparatus comprising:
   a locking module disposed adjacent to the slot, the locking module configured to have a locked mode and an unlocked mode, the locking module having a bump structure, and the locking module configured to lock the stylus in the slot under the locked mode by putting the bump structure into the stylus;
   an input interface configured to obtain authentication information; and
   a control circuit coupled to the locking module and the input interface, the control circuit configured to verify the authentication information obtained by the input interface, and when the authentication information is verified, the control circuit switching the locking module from the locked mode to the unlocked mode by adjusting a location of the bump structure.

2. The electronic apparatus of claim 1, further comprising:
   a sensor module coupled to the control circuit and configured to sense location information of the stylus; and
   an alert module coupled to the control circuit, wherein under the unlocked mode, the control circuit selectively controls the alert module to send a warning message according to at least the location information.

3. The electronic apparatus of claim 2, wherein the sensor module comprises a first area communication circuit, the stylus comprises a second area communication circuit, and the first area communication circuit is configured to establish a communication link with the second area communication circuit of the stylus under the unlocked mode, the first area communication circuit generates the location information of the stylus according to whether the communication link exists, and the control circuit controls the alert module to send the warning message when the communication link is interrupted or when signal strength of the communication link is less than a threshold value.

4. The electronic apparatus of claim 3, wherein the first area communication circuit and the second area communication circuit of the stylus are paired with each other, and the electronic apparatus stores identification information of the second area communication circuit, wherein under the locked mode, the control circuit determines whether the stylus in the slot is a paired stylus based on the identification information.

5. The electronic apparatus of claim 2, wherein the sensor module comprises a sensor switch disposed adjacent to the slot, and the sensor switch is configured to detect whether the stylus is located in the slot, in order to generate the location information of the stylus.

6. The electronic apparatus of claim 5, wherein the sensor switch comprises a movable mechanical structure disposed at one end of the slot, and when the authentication information is verified, the movable mechanical structure ejects at least one portion of the stylus from the slot.

7. The electronic apparatus of claim 5, wherein the sensor switch comprises an optical sensor or an electrical contact sensor.

8. The electronic apparatus of claim 5, wherein, under the unlocked mode, the control circuit determines whether the electronic apparatus enters a sleep mode or a shutdown mode from a startup mode, and when the electronic apparatus enters the sleep mode or the shutdown mode and the sensor switch detects that the stylus is not located in the slot, the control circuit controls the alert module to send the warning message.

9. The electronic apparatus of claim 1, wherein the authentication information obtained by the input interface comprises a biometric feature or an unlock command.

10. The electronic apparatus of claim 9, wherein the input interface comprises at least one of a camera unit, a touch screen, a touch pad, a keyboard, a fingerprint reader, or a microphone for acquiring the biometric feature or the unlock command.

11. A control method, applied to an electronic apparatus having a slot for accommodating a stylus, the control method comprising:
  locking the stylus in the slot under a locked mode by putting a bump structure of a locking module of the electronic apparatus into the stylus;
  obtaining authentication information; and
  checking the authentication information to verify the authentication information by using a control circuit of the electronic apparatus, and switching from the locked mode to an unlocked mode by adjusting the location of the bump structure according to control of the control circuit if the authentication information is verified.

12. The control method of claim 11, further comprising:
  sensing location information of the stylus under the unlocked mode, and selectively sending a warning message according to the location information.

\* \* \* \* \*